US006643752B1

(12) United States Patent
Donnelly et al.

(10) Patent No.: US 6,643,752 B1
(45) Date of Patent: Nov. 4, 2003

(54) TRANSCEIVER WITH LATENCY ALIGNMENT CIRCUITRY

(75) Inventors: Kevin Donnelly, Los Altos, CA (US); Mark Johnson, Los Altos, CA (US); Chanh Tran, San Jose, CA (US); John B. Dillon, deceased, late of Palo Alto, CA (US); by Nancy D. Dillon, executor, Washington, VA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 09/458,582

(22) Filed: Dec. 9, 1999

(51) Int. Cl.[7] .............................................. G06F 12/00
(52) U.S. Cl. ...................... 711/167; 365/233; 709/217; 709/248; 709/400; 710/25; 710/29; 710/36; 710/58; 713/400; 713/500; 713/600
(58) Field of Search ....................... 365/189.05, 189.07, 365/189.08, 191, 233; 709/208, 217, 232, 248, 400; 710/6, 25, 29, 36, 45, 58, 60, 61, 106; 711/154, 167; 713/400, 500, 600

(56) References Cited

U.S. PATENT DOCUMENTS

| 4,631,666 A | * | 12/1986 | Harris et al. ................. 709/217 |
| 5,371,880 A | * | 12/1994 | Bhattacharya ............... 713/400 |
| 5,400,360 A | * | 3/1995 | Richards et al. ............. 375/214 |
| 5,475,818 A | * | 12/1995 | Molyneaux et al. ......... 709/208 |
| 5,511,224 A | | 4/1996 | Tran et al. .................... 395/800 |
| 5,513,377 A | * | 4/1996 | Capowski et al. ............. 710/61 |
| 5,574,945 A | | 11/1996 | Elko et al. .................... 395/825 |
| 5,655,113 A | * | 8/1997 | Leung et al. ................. 713/401 |
| 6,330,687 B1 | * | 12/2001 | Griffith ............................. 714/6 |

FOREIGN PATENT DOCUMENTS

EP          0 811 916 A2      12/1997

OTHER PUBLICATIONS

PCT International Search Report (Jun. 27, 2001) 4 pages.

\* cited by examiner

Primary Examiner—Donald Sparks
Assistant Examiner—Christian P. Chace
(74) Attorney, Agent, or Firm—Pennie & Edmonds LLP

(57) ABSTRACT

A transceiver system is described. A secondary memory module is coupled to a primary channel for receiving data and signals from a controller. The secondary memory module comprises a memory and a secondary channel for transmitting the data and control signals to the memory. The secondary memory module further comprises a transceiver coupled to the primary channel and the secondary channel. The transceiver is designed to electrically isolate the secondary channel from the primary channel. The transceiver is a low latency repeater to permit the data and the control signals from the controller to reach the memory, such that a latency of a data request from the controller is independent of a distance of the transceiver from the controller.

25 Claims, 9 Drawing Sheets

TRANSCEIVER WITH LATENCY ALIGNMENT CIRCUITRY

FIELD OF THE INVENTION

The present invention relates to communication systems, and more particularly to a communication path that includes one or more latency-aligning transceivers.

BACKGROUND

FIG. 1 illustrates a prior art memory system that includes multiple integrated circuit memory devices 120 coupled to a memory controller 110 via a bidirectional communication channel 140. Because each memory device 120 consumes physical space along the channel, the number of memory devices that can be coupled to the channel 140, and to some extent the storage capacity of the memory system, is limited by the length of the channel 140. The length of the channel 140 is itself limited by a number of practical considerations. For example, signals attenuate as they propagate down the channel 140, constraining the channel length to one that provides a tolerable signal level at the memory IC farthest from the controller 110. Similarly, channel capacitance increases with channel length, limiting the frequency response of the channel. Accordingly, the channel length usually must be limited to support the desired operating frequency of the memory system.

One technique for increasing the number of memory devices that can be used in a memory system without unacceptable loss in signaling margin or frequency response is to use buffering circuits to segment the communication path into multiple smaller channels. Unfortunately, buffers add latency that can be problematic, particularly in synchronous memory systems which rely on deterministic timing relationships. For example, in some memory systems, memory operations are pipelined by transmitting commands in the intervening time between transmission of an earlier command (e.g., a read command) and responsive transmission of the corresponding data (e.g., the read data). When buffers are positioned along the channel's length, however, the time intervals between command and response transmissions vary arbitrarily depending on the positions of the addressed memory devices (i.e., memory devices positioned downstream from one or more buffers or repeaters exhibit greater effective response delay than memory devices coupled directly to the memory controller). This significantly complicates command pipelining.

Thus, it is desirable to provide a memory subsystem that can support a large number of memory devices without degrading the reliability and performance of the memory system.

SUMMARY

A memory system including one or more transceivers with latency alignment circuitry is disclosed in various embodiments. The memory system includes a communication path that is segmented into a primary channel and one or more stick channels by appropriate placement of the latency aligning transceivers. In one embodiment, the transceivers buffer clock, control and data signals while also aligning the latency in the round-trip path between the memory controller and the stick channel driven by the transceiver to a clock cycle boundary. When memory devices that have adjustable response delays are coupled to the different stick channels in the memory system, the memory system can be configured so that the total response latency is substantially the same for each memory IC in the memory system. This simplifies command pipelining significantly, permitting commands to be packed densely within the available channel bandwidth. As discussed below, stick channels themselves can feed one or more additional transceivers, making any number of interconnection topologies possible.

These and other features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
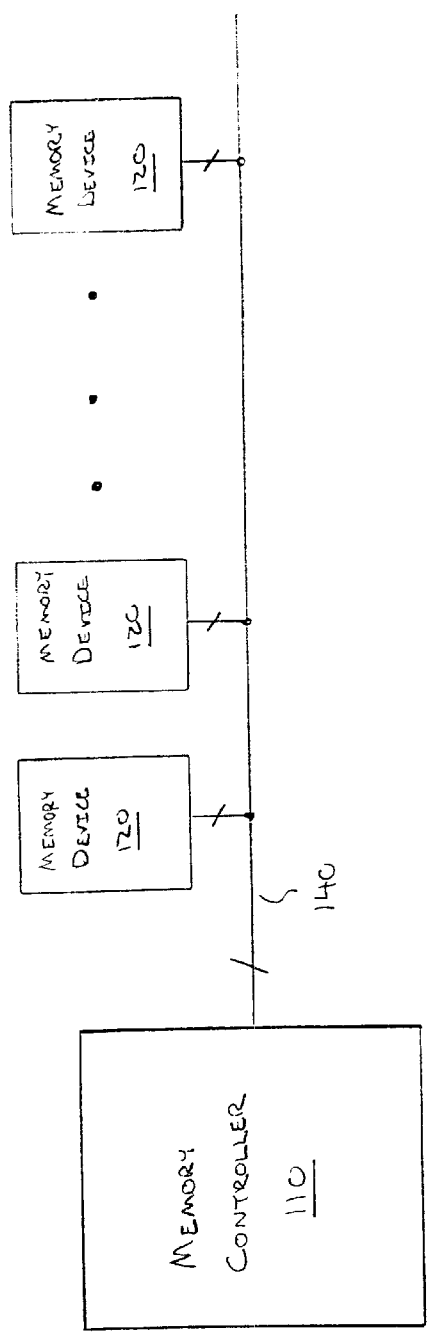
FIG. 1 illustrates a prior art memory system.
Figure 2:
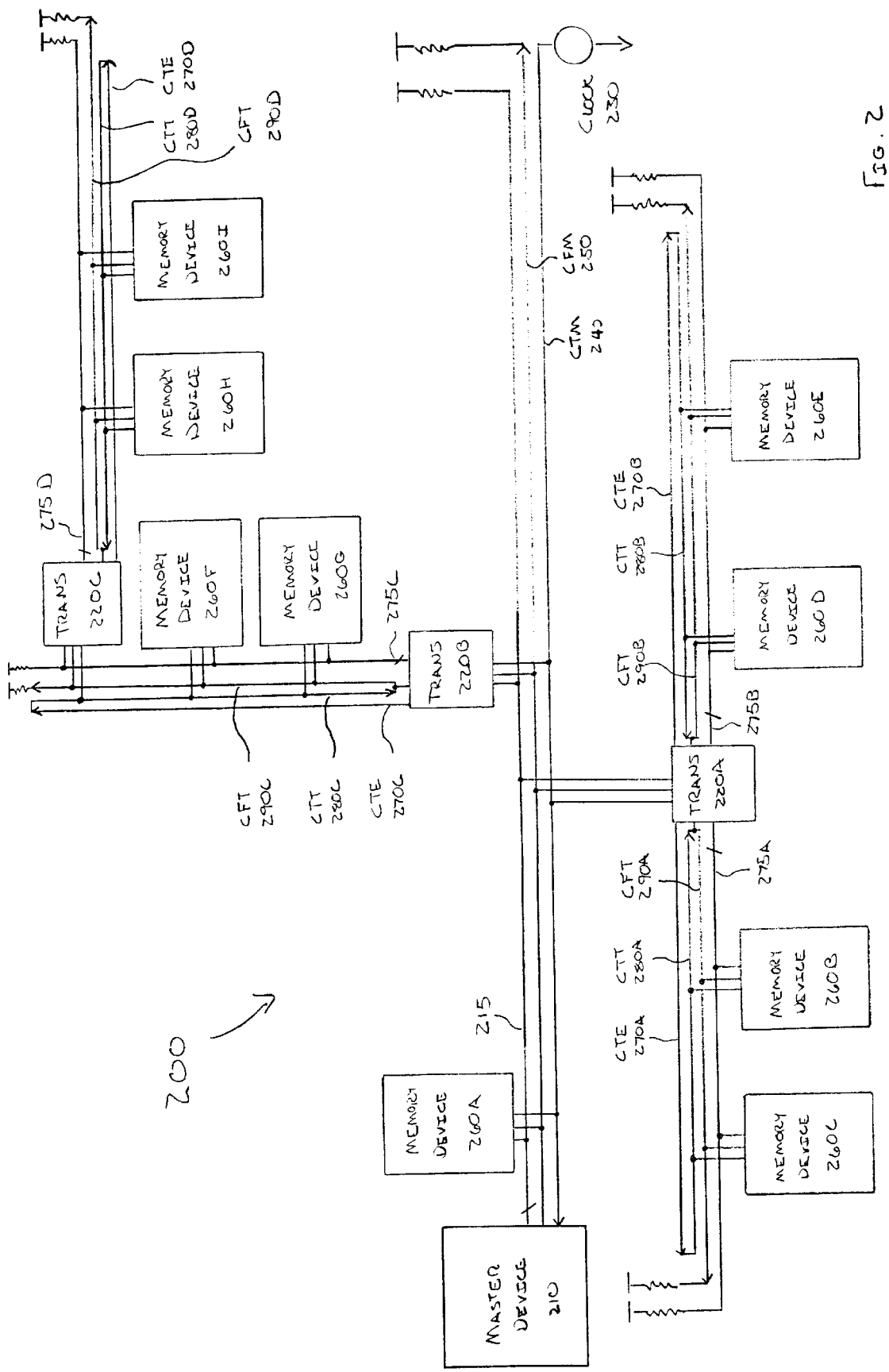
FIG. 2 is a block diagram of a memory system according to one embodiment of the present invention.

FIG. 2 is a block diagram of a memory system 200 according to one embodiment of the present invention. The memory system 200 includes a master device 210 (e.g., a memory controller) coupled to a plurality of memory devices 260A–260I via a communication path formed by a primary channel 215 and stick channels 275A–275D. In one embodiment, the master device, transceivers and memory devices transmit signals on the communication path through current-mode signaling. That is, each conductor in a given channel 275A–275D is pulled up to a predetermined voltage level through a termination impedance and may be driven to at least one lower voltage level by sinking an appropriate amount of current. Although the termination impedances are depicted in FIG. 2 as being coupled to the ends of the channels 275A–275D, the termination impedances may alternatively be placed at any point along their respective channels, including within the master device 210, or within a transceiver or memory device coupled to the channel.

In an alternative embodiment, voltage mode signaling may be used in which the master device, transceivers and memory devices output digital voltage levels to the bus to effect digital signaling. In voltage mode embodiments, the bus may be allowed to float or the bus may be pulled up or down through termination impedances.

In the embodiment of FIG. 2, a clock generator 230 generates a clock signal 240 called clock-to-master (CTM)

that propagates toward master device 210. A second clock signal 250, preferably having the same frequency as CTM 240, propagates away from the master device 210 and is called clock-from-master (CFM). CTM 240 is used to clock the transmission of information to master device 210 on the primary channel 215, while CFM 250 is used to clock transmission of information from the master device 210 to memory device 260A and transceivers 220A and 220B. Together CTM and CFM provide for source synchronous transmission of data (i.e., data travels with clock) in both directions on the primary channel 215. In one embodiment, CTM 240 and CFM 250 are the same signal, with the conductors that carry CFM 250 and CTM 240 being coupled to one another at or near the master device 210 (e.g., within the master device 210, at a pin of the master device 210 or at another point just outside the master device 210). In alternative embodiments, clock signals CTM 240 and CFM 250 may be separately generated. For example, master device 210 may include a clock generator circuit that generates CFM 250 in a predetermined phase relationship to CTM 240.

Regardless of whether CTM 240 and CFM 250 are the same signal or separately generated, CTM 240 and CFM 250 will have a different phase relationship at different points along the primary channel due to the fact that they are traveling in different directions. For example, if CFM and CTM are in phase at master device 210, then at transceiver 220B, they will be out of phase by the amount of time it takes for CTM 240 to travel from the transceiver 220B to the master 210 plus the time it takes for CFM 250 to travel from the master 210 to the transceiver 220B. This phase difference between CTM and CFM, referred to herein as $t_{TR}$, is different at each point along the primary channel.

Each of transceivers 220A–220C serves as a bi-directional repeater between a host channel (i.e., a channel used to deliver signals from the master device 210) and at least one stick channel. More specifically, transceiver 220B serves as a bi-directional repeater between host channel 215 (the primary channel) and stick channel 275C; transceiver 220C serves as a bi-directional repeater between host channel 275C and stick channel 275D; and transceiver 220A serves as a bi-directional repeater between host channel 215 and each of stick channels 275A and 275B. In one embodiment, each of the transceivers 220A–220D provides regenerative gain and drive capability and resynchronizes signal transmissions between the clock domain of the host channel and the stick channel. It should be noted that the channel topology depicted in FIG. 2 is merely an example—numerous alternative channel topologies may be constructed without departing from the spirit and scope of the present invention.

By using transceivers 220A–220D to segment the overall communication path into multiple segments, the resistive and capacitive loading of any given length of the communication path may be kept below a tolerable threshold. This permits the communication path to be extended to support more memory devices without unacceptable loss of signal margin due to resistive or capacitive loading.

Although each of transceivers 220A–220C is shown in FIG. 2 as supporting one or two stick channels, a given transceiver may support any number of stick channels up to a practical limit. Also, though the primary channel 215 and stick channels 275A–275D are each shown as supporting one or two memory devices, more memory devices may be supported by the channel segments in alternate embodiments. Similarly, any number of transceivers up to a practical limit may be hosted by a given channel segment.

In one embodiment, each of the transceivers uses the clock signals that correspond to its host channel to generate one or more clock signals for the stick channel (or channels) that it serves. For example, transceiver 220B generates a clock signal "clock-to-end" (CTE) 270C based on clock signals CTM 240 and CFM 250. CTE 270C is folded back at the end of stick channel 275C to provide clock signal "clock-to-transceiver" (CTT) 280C, which in turn is used to generate clock signal "clock-from-transceiver (CFT) 290C. Similarly, transceiver 220C generates clock signals CTE 270D, CTT 280D and CFT 290D based on clock signals CTT 280C and CFT 290C, and transceiver 220A generates clock signals CTE 270A, CTT 280A, CFT 290A, CTE 270B, CTT 280B and CFT 290B from clock signals CTM 240 and CFM 250.

The relationship between CTM 240 and CFM 250 described above applies to the clock signals CTT and CFT generated for each stick channel. For example, in the embodiment of FIG. 2, CTT and CFT for a given stick channel are the same signal, with their respective conductors being coupled together at or near the transceiver for the stick channel (e.g., within the transceiver, at a pin of the transceiver or at another point just outside the transceiver). In alternative embodiments, CTT and CFT may be separately generated. For example, a given transceiver may include a clock generator circuit that generates CFT in a predetermined phase relationship to CTT.

Regardless of whether CTT and CFT are the same signal or separately generated, CTT and CFT will have a different phase relationship at different points along the stick channel they serve. This phase difference between CTT and CFT for a given stick channel is analogous to the phase difference, $t_{TR}$, between CTM 240 and CFM 250 discussed above, and is referred to herein as t-stick$_{TR}$. As discussed below, transceivers 220A–220D perform a latency alignment function by adjusting the transfer latency from host channel to stick channel according to the phase difference between the host channel's clocks (i.e., $t_{TR}$ when the host channel is the primary channel 215 and t-stick$_{TR}$ when the host channel is a stick channel).

In one embodiment, the CFT and CTT clocks on stick channels (stick clocks) are synchronized to CTM 240 on the primary channel 215. Requests/commands from the master device 210 are received with CFM and resynchronized to CFT for retransmission on the stick channel. This timing relationship is discussed below in further detail.

Figure 3A:
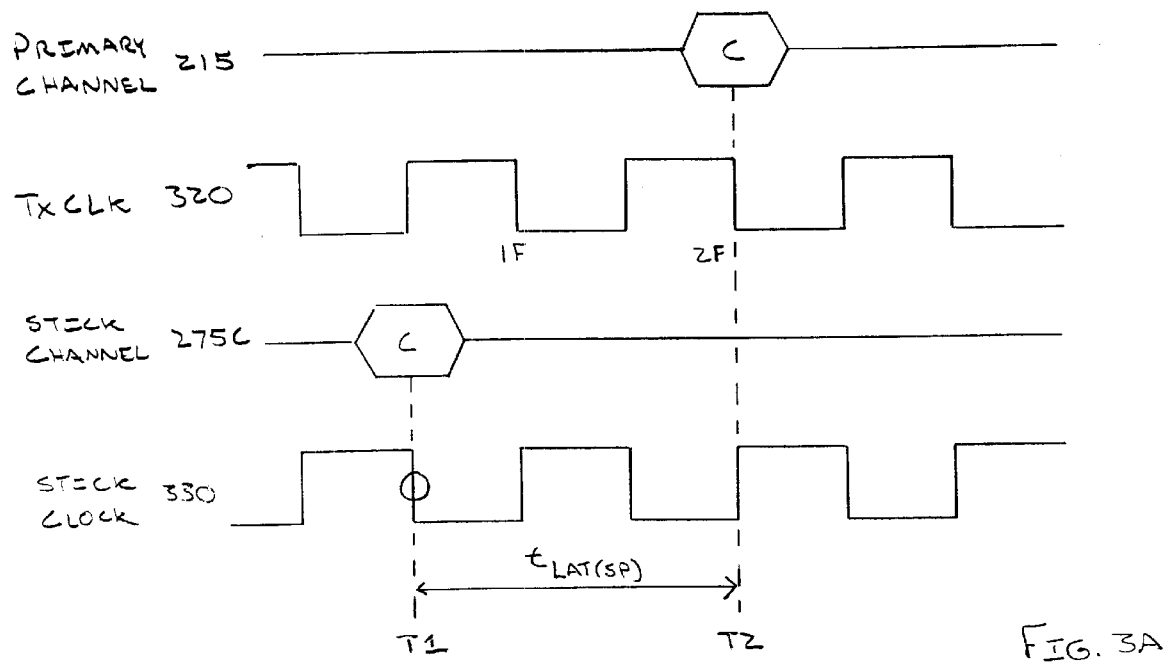
FIG. 3A is a timing diagram of a data transfer operation in the memory system of FIG. 2.

FIG. 3A is a timing diagram of a data transfer operation in the memory system 200 of FIG. 2. More specifically, FIG. 3A illustrates the timing of a data transfer from memory device 260G to master device 210. Data C is available on stick channel 275C at the falling edge of StickClk 330. In the embodiment shown, TxClk 320 is the equivalent of CTM 240 and StickClk 330 is 180 degrees out of phase with TxClk 320. Data C is transferred onto the primary channel 215 at the second falling edge of TxClk 320 at time T2. The overall propagation delay from the primary channel 215 to the stick channel 275 (i.e., the latency incurred crossing transceiver 220B) is $t_{LAT(SP)}$. In the embodiment shown, $t_{LAT(SP)}$ is 1.5 clock cycles in duration.

Figure 3B:
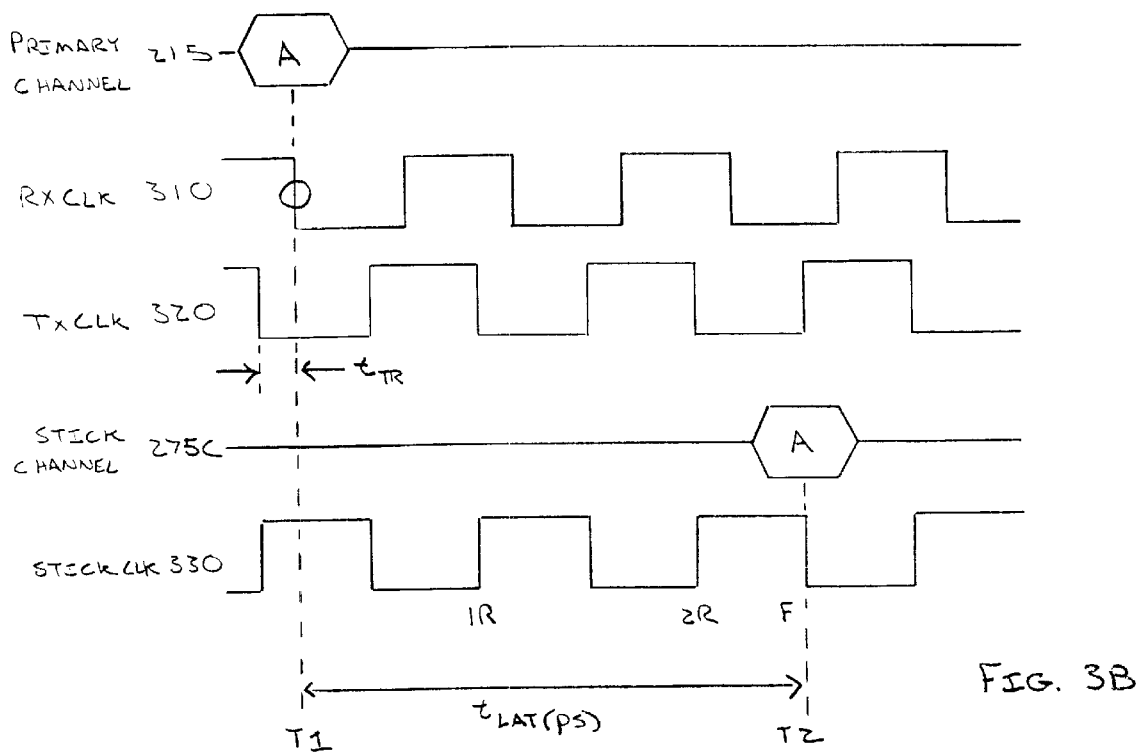
FIG. 3B is a timing diagram of the data transfer from a master device to a memory device.

FIG. 3B illustrates the timing of a data transfer in the opposite direction—from master device 210 to memory device 260G. The primary channel 215 has data A on it at a first time, at a falling edge of RxClk 310. For one embodiment, RxClk 310 is equivalent to CFM 250. CFM 250 lags CTM 240 by time $t_{TR}$ so that RxClk 310 lags TxClk 320 by time $t_{TR}$. As discussed above, time $t_{TR}$ is twice the time of flight down the bus, which is the difference in phase between CTM and CFM at the pin of the slave device (transceiver). Generally period $t_{TR}$ should be less than one cycle (e.g. 0.8 $t_{CYCLE}$), otherwise the timing relationship may be confusing (i.e. 2.2 cycles looks just like 0.2 cycles). In alternative embodiments, circuitry for tracking multiple cycles may be used so that $t_{TR}$ need not be limited to less than a clock cycle.

At the falling edge of RxClk 310, data A is available to the transceiver. For one embodiment, transceiver latches data A at this time. The data A is available on the stick channel 275C on the falling edge F of stick clock 330, after the rising edge 2R. The overall propagation delay from the primary channel 215 to the stick channel 275C is $t_{LAT(PS)}$.

Figure 3C:
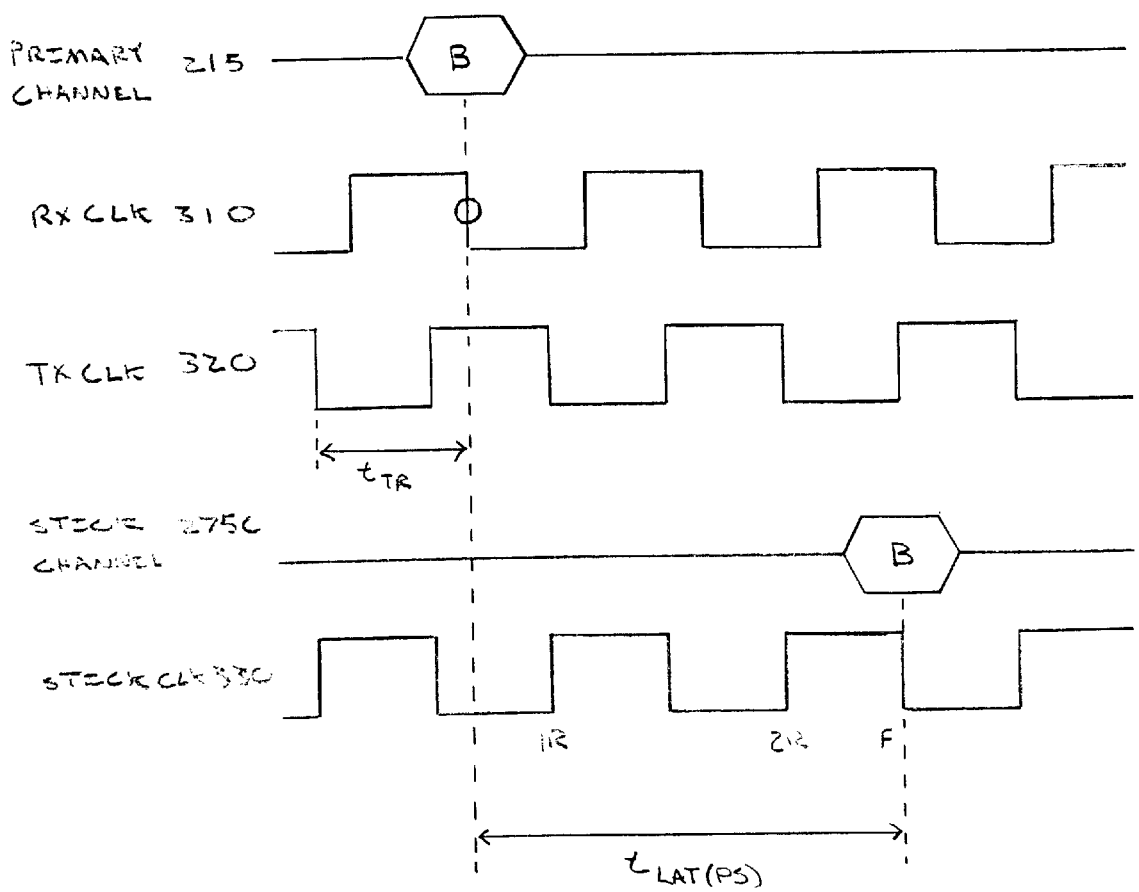
FIG. 3C is another timing diagram of a data transfer from the master device to a memory device.

FIG. 3C is a timing diagram of a data transfer from the master device 210 to the memory device 260G when $t_{TR}$ is relatively large (e.g., 0.8 tcycle). As shown, data B is available on primary channel 215 at a falling edge of RxClk 310 and then on the stick channel 275C at time T2, the first falling edge after the second rising edge 2R of StickClk 330. The overall propagation delay from the primary channel 215 to the stick channel 275 is $t_{LAT(PS)}$.

Referring to FIGS. 3B and 3C, it can be seen that the transfer latency from primary channel to stick channel ($t_{LAT(PS)}$) is dependent upon the time $t_{TR}$. More specifically, $t_{LAT(PS)}$ is given by a predetermined number of clock cycles less the round trip time on the channel between the transceiver and the master device, $t_{TR}$. In an embodiment having the timing characteristic shown in FIGS. 3B and 3C, the latency incurred crossing the transceiver in the direction of the stick channel may be expressed mathematically as $t_{LAT(PS)}$=2.5 cycles–$t_{TR}$. Accordingly, when $t_{TR}$ is larger, $t_{LAT(PS)}$ is smaller (compare FIGS. 3B and 3C). Thus, the transceiver 220B effectively adjusts the time delay to repeat signals from the primary channel 215 on the stick channel 275C to compensate for the flight time down the primary channel in each direction. The result of this compensation is that the roundtrip latency between the master device and a stick channel (not counting t-stick$_{TR}$ or the latency required for the target memory device to respond) is aligned to a clock cycle boundary. Said another way, the round-trip latency between the master device and a stick channel is independent of the distance on the primary channel between the transceiver and the master device 210.

Figure 4:
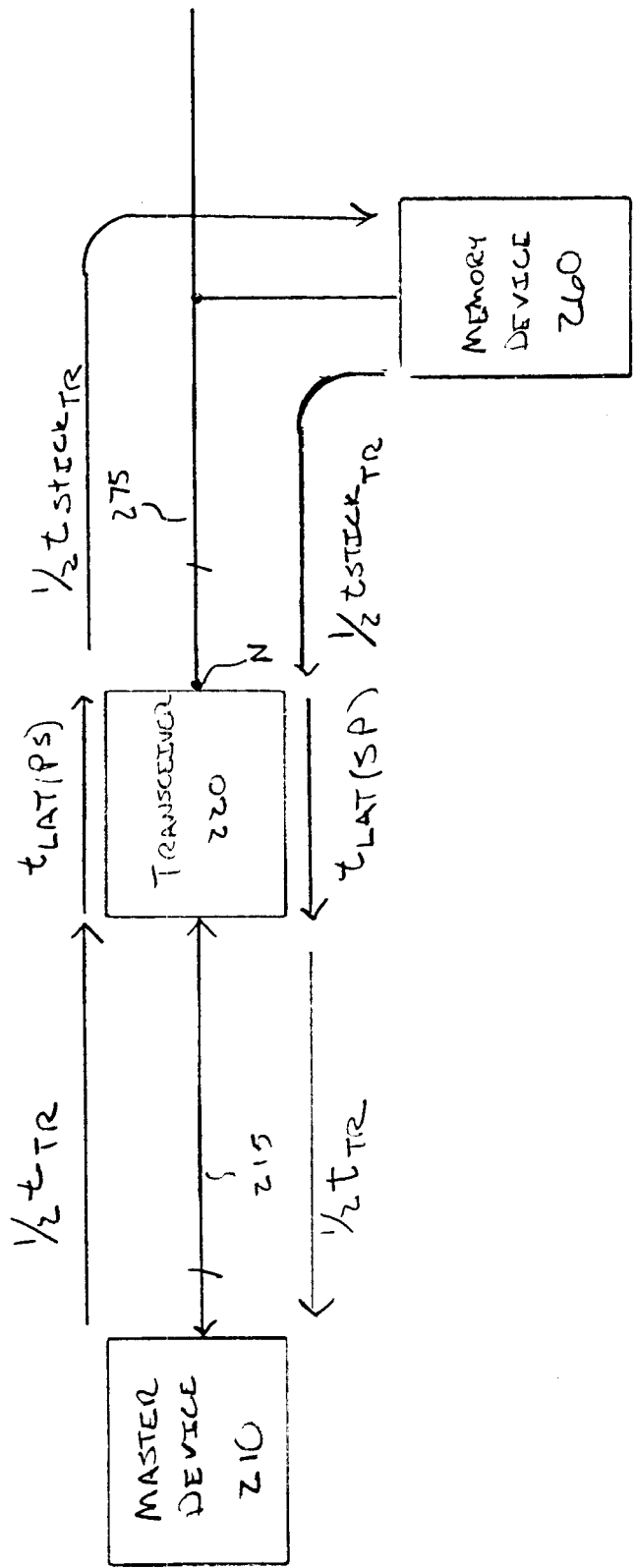
FIG. 4 illustrates the response latency of a memory transaction according to one embodiment.

FIG. 4 illustrates the response latency of a memory transaction in greater detail. As shown, the overall response latency perceived by the master device is made up of the following latencies:

| | |
|---|---|
| 1. Flight time on primary channel 215 from master device 210 to transceiver 220 | $0.5t_{TR}$ |
| 2. Time to cross transceiver 220 from primary channel 215 to stick channel 275 | $t_{LAT(SP)}$ = (X cycles) − $t_{TR}$ |
| 3. Flight time on stick channel from transceiver 220B to memory device 260G | $0.5tstic_{TR}$ |
| 4. Response latency of memory device | $t_{DEVLAT}$ |
| 5. Flight time on stick channel from memory device 260G to transceiver 220B | $0.5tstic_{TR}$ |
| 6. Time to cross transceiver 220 from stick channel 275 to primary channel 215 | $t_{LAT(SP)}$ = Y cycles |
| 7. Flight time on primary channel 215 from transceiver 220B to master device 210 | $0.5t_{TR}$ |
| Total | (X + Y) cycles + t-stick$_{TR}$ + $t_{DEVLAT}$ |

Note that, because the time to cross the transceiver 220 from primary channel 215 to stick channel 275 is compensated to account for the round trip flight time on the primary channel ($t_{TR}$), the primary channel flight time does not appear in the expression for total latency. More specifically, the round-trip latency between the master device 210 and the stick channel 275 (i.e., node N) is equal to X+Y cycles. By selecting X and Y to add to a whole number of clock cycles, the round-trip latency between the master device 210 and the stick channel 275 is effectively aligned with a clock for the primary channel (CTM 240 in the embodiment of FIG. 2). That is, the round-trip time from the master device 210 to a given stick channel is aligned on a clock cycle boundary. As discussed below, this latency alignment simplifies timing in the memory system significantly, allowing more efficient bandwidth utilization on the primary channel and stick channels than is achieved with the above-described prior art techniques. Referring to FIG. 2, for example, by choosing X to be 2.5 clock cycles and Y to be 1.5 clock cycles (the timing shown in FIGS. 3A and 3B), the roundtrip latency between master device 210 and any one of stick channels 275A, 275B and 275C is aligned with every fourth clock cycle of CTM 240. Consequently, the master device 210 may use the four clock cycles which follow a transmission to any of memory devices 260B–260I to transmit or receive other information on the primary channel 215.

Figure 5:
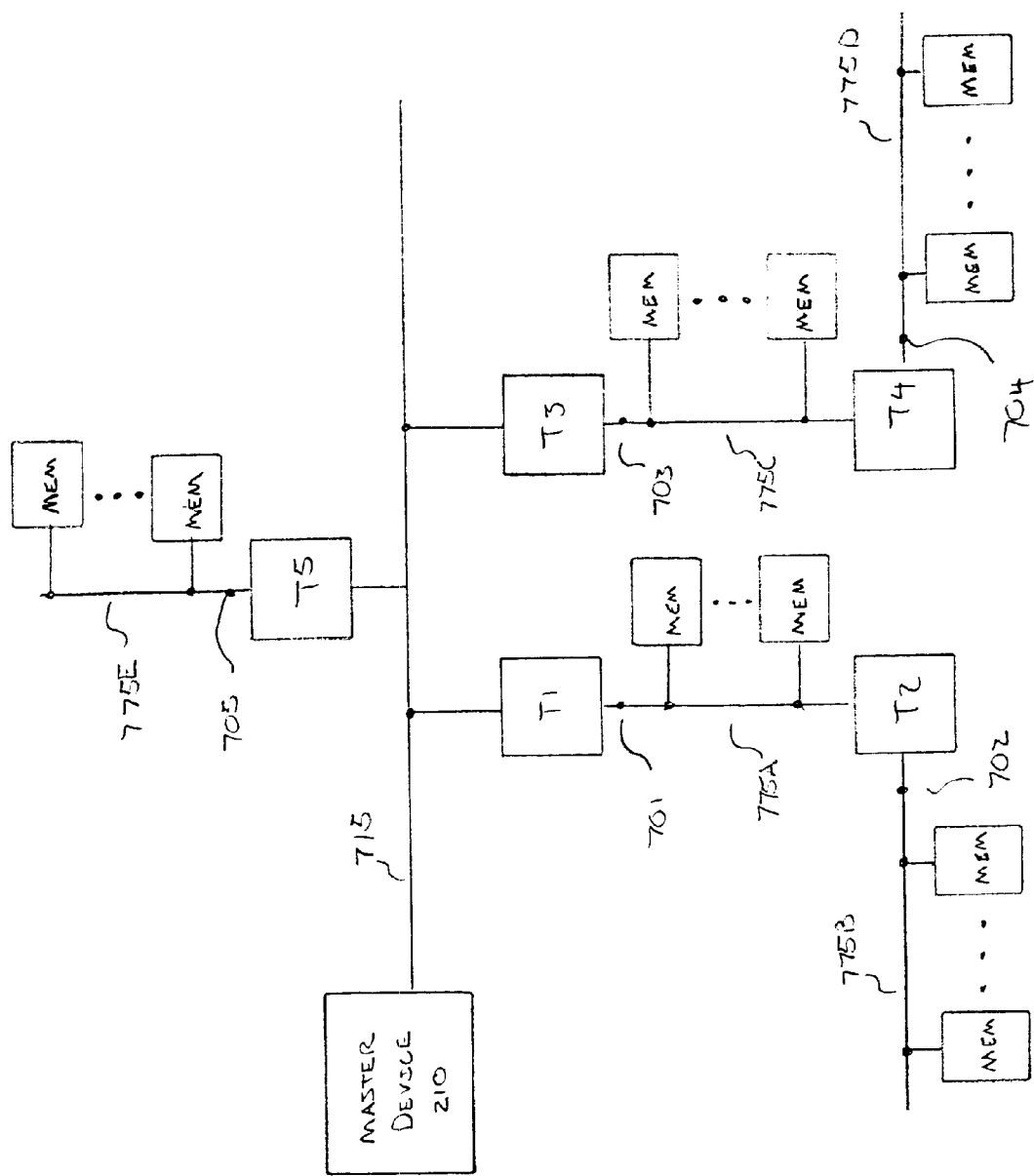
FIG. 5 illustrates the scaleability of a memory system according to one embodiment.

FIG. 5 illustrates the scaleability of the above-described latency alignment technique and the manner in which programmable latency registers may be used in conjunction with latency-aligning transceivers to establish a flat response latency over an entire memory system. Memory system 700 includes a number of transceivers (T1–T5) that each serve as bi-directional repeaters for respective stick channels (775A–775E). Transceivers T1, T3 and T5 are each coupled to the primary channel 715 and include latency alignment circuitry that aligns the round-trip latency between the master device and stick channels 775A, 775C and 775E, respectively, to an integer number of clock cycles, N. Transceivers T2 and T4 are hosted by stick channels 775A and 775C, respectively, and include latency alignment circuitry that aligns the round-trip latency between the respective masters (T1 and T3) for their host channels and stick channels 775B and 775D to the integer number of clock cycles, N. In one embodiment, N is equal to four so that the round-trip latency between master device 210 and stick channel 775A is four clock cycles and the round-trip latency between master device 210 and stick channel 775B is eight clock cycles. More generally, the latency from the master device 210 to a given stick channel is M×N, where M is the number of transceivers that must be crossed to reach the stick channel, and N is the latency-aligned, round-trip time from a master of a given host channel to a stick channel that is coupled to the host channel through a single transceiver.

Note that no matter how many transceivers must be crossed in the memory system of FIG. 5, the overall round-trip time between master device 210 and any stick channel in the memory system is aligned with the transmit clock of master device 210 (e.g., CFM 250 in FIG. 2). This enables construction of memory systems having large numbers of memory devices ("MEM" in FIG. 5) without loss of determinism in system timing. The intervals between command and response transmissions are well defined and may therefore be used for command and response pipelining.

Another benefit of the above-described latency-aligning tranceivers is that they may be used in conjunction with programmable-latency memory devices to provide a memory system with flat latency response. That is, the response latency of all memory devices may be made substantially equal, regardless of their proximity to the master device 210. Referring to FIG. 5, for example, memory devices hosted by stick channels 775A, 775C and 775E may be programmed to delay their outputs by four clock cycles so that the overall response latency for all memory devices in the memory system is substantially equal (with sub-clock cycle variance due to relative positions of memory devices on their stick channels). Expressed analytically, the total response delay perceived by the master device 210 is:

$$(N \times M) + t\text{-stick}_{TR} + t_{DEVLAT} + t_{DEV\_PROG},$$

where $t_{DEV\_PROG}$ is the number of additional cycles of delay programmed within a given memory device, M is the number of transceivers that must be crossed to reach the stick channel that hosts the target memory device, and N is the latency-aligned, round-trip time from a master of a host channel to a stick channel coupled to the host channel through a single transceiver. Thus, to provide a flat response latency throughout the memory system, the delay time ($t_{DEV\_PROG}$) for each memory device in the memory system may be set as follows:

| No. Transceivers Separating Memory Device From Master Device 210 | $t_{DEV\_PROG}$ |
|---|---|
| M | 0 |
| M − 1 | N |
| M − 2 | 2N |
| . | . |
| . | . |
| . | . |
| 1 | (M − 1) × N |
| 0 | M × N |

In this way, the total response latency will be substantially the same for each memory device in the memory system, regardless of the number of memory devices or stick channels in the memory system.

Figure 6:
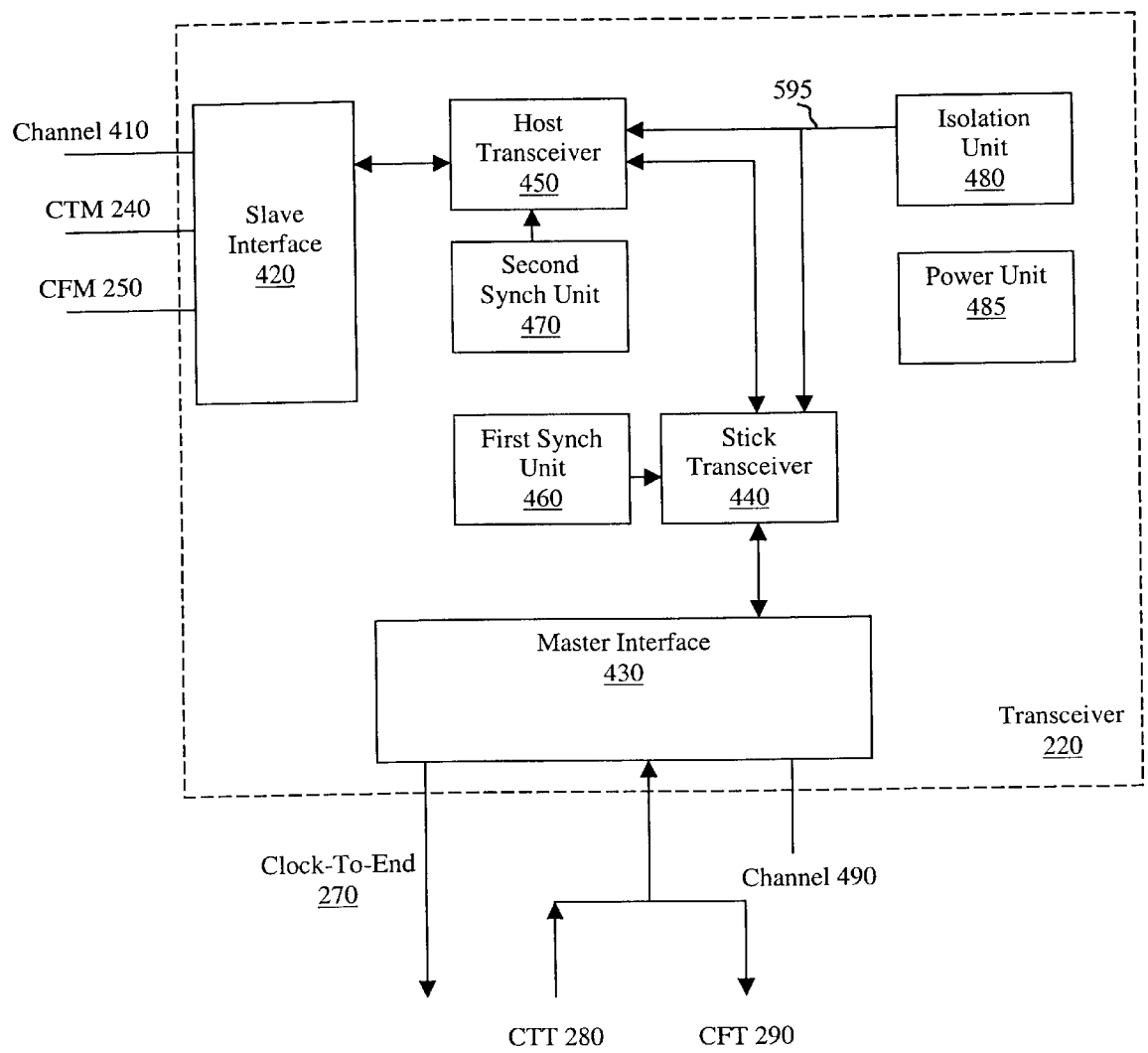
FIG. 6 is a block diagram of a transceiver according to one embodiment.

FIG. 6 is a block diagram of a transceiver according to one embodiment. The transceiver 220 receives the CTM 240 and CFM 250 clock signals from the master device. The transceiver 220 further receives host channel 410. Host channel 410 transmits address and data information from the master device to the transceiver 220. For one embodiment, host channel 410 is a parallel bus, having multiple conductors. For another embodiment, host channel 410 is a serial communication path. For another embodiment, host channel 410 may include multiple buses, such as an address bus and a separate data bus, or even multiple control paths.

The transceiver 220 acts as a slave device toward the master device 210 and includes a slave interface 420 to receive data and control signals from the master device via host channel 410. To the master device, the transceiver 220 appears to be a memory device. Requests from the master device arrive at the transceiver in the CFM 250 timing domain, and responses are sent back to the master in the CTM 240 timing domain. The master device 210 does not need to be modified to interact with the transceiver.

On the stick channel 490, the transceiver 220 functions as a master device, providing a master interface 430 to retransmit the requests/commands from the master device to the memory devices (or transceivers) coupled to stick channel 490, and to forward responses from the memory devices to the master device via the slave interface 420 and host channel 410. The memory devices perceive no difference in system operation resulting from the presence of transceiver 220 and therefore require no design modification.

The transceiver 220 provides the clock-from-transceiver (CFT) 290 and clock-to-transceiver (CTT) 280 signals to the memory devices and transceivers coupled to channel 490. In one embodiment, CTE 270 is routed to the end of the stick channel where it is folded back to provide CTT 280. As discussed above, CTT 280 is folded back away from the transceiver 220 to provide CFT 290.

Data is transmitted to devices coupled to stick channel 490 in the CFT 290 clock domain and received from devices coupled to stick channel 490 in the CTT 280 clock domain.

For one embodiment, the transceiver 220 includes a stick transceiver 440 and a host transceiver 450. The stick transceiver 440 transmits and receives data on the stick channel 490. The host transceiver 450 transmits and receives data on the host channel 410.

The transceiver 220 further includes a first synchronizing unit 460. The synchronizing unit 460 synchronizes data transmitted from the memory channel to the stick channel to the CFT 290. For one embodiment, the transceiver 220 may also include a second synchronizing unit 470 for synchronizing signals transmitted from the stick channel 490 to the host channel 410 with CTM 240. For one embodiment, the second synchronizing unit 470 may be omitted if the CTT clock is synchronized with one of the clocks on the memory channel (e.g., in an embodiment in which the stick clocks CTT and CFT are synchronized with CTM 240).

The transceiver 220 further includes an isolation unit 480 that operates to prevent the transceiver 220 from repeating signals onto either the host channel 410 or the stick channel 490. For one embodiment, the isolation unit 480 asserts an isolate signal 595 to force both sets of bus driver circuits into a high-impedance (non-driving) state. Using the isolate feature, the transceiver 220 can effectively split a memory system into two partitions. In normal operation (not isolated), the transceiver 220 passes packets between the two partitions and the channel functions normally. When the transceiver's isolation unit 480 is enabled, the two partitions become electrically isolated and, if desired, each individual section can operate independently. This may be advantageous in certain graphics applications, for example with a frame buffer and normal (code and data) DRAMs sharing a single channel partitioned by a transceiver.

The transceiver 220 further includes a power logic 485 for turning off the transceiver 220 when it does not need to transmit. In one embodiment, power logic 485 merely turns off the stick transceiver 440, so that signals received via host channel 410 are not retransmitted on stick channel 490. Circuitry may be provided to interpret incoming addresses to determine whether they decode to memory devices coupled to stick channel 490 (or downstream stick channels). Stick transceiver 440 may then be selectively enabled and disabled depending on whether memory devices coupled to stick channel 490 are being addressed. For example, if a certain amount of time passes (or transactions detected) without memory devices coupled to stick channel 490 being addressed, power unit 485 may disable stick transceiver 440 to save power. Alternatively, transceiver 220 may power down stick transceiver 440 and other circuitry within transceiver 220 in response to a power-save command received on the host channel 410. Also, in alternative embodiments, transceiver 220 may remain fully enabled at all times and power unit 485 may be omitted altogether.

For one embodiment the transceiver 220 does not interpret incoming transmissions on the host channel and therefore does not respond to commands. That is, the transceiver 220 cannot be "addressed" by a master device (e.g., device 210 of FIG. 2). Consequently, in this embodiment the transceiver 220 does not include registers which may be read or written by a master device. In alternative embodiments, the transceiver 220 include command interpretation circuitry for parsing packetized commands or other transmissions received on the host channel. In these embodiments, the transceiver 220 may perform timing adjustments or other operations in response to commands from a master device. For example, the transceiver 220 may perform output driver calibration or other signal parameter calibration operations in response to commands from the master device. Also, instead of calibration, the transceiver 220 may receive control parameters from the master device and install them in appropriate registers to provide master-specified signal adjustments (e.g., adjustments to slew rate, drive strength, receive and transmit timing, equalization, reference voltage adjustment, clock duty cycle correction and so forth). Moreover, as discussed above, the transceiver 220 may enter a power-saving state in response to commands received on the host channel.

Figure 7:
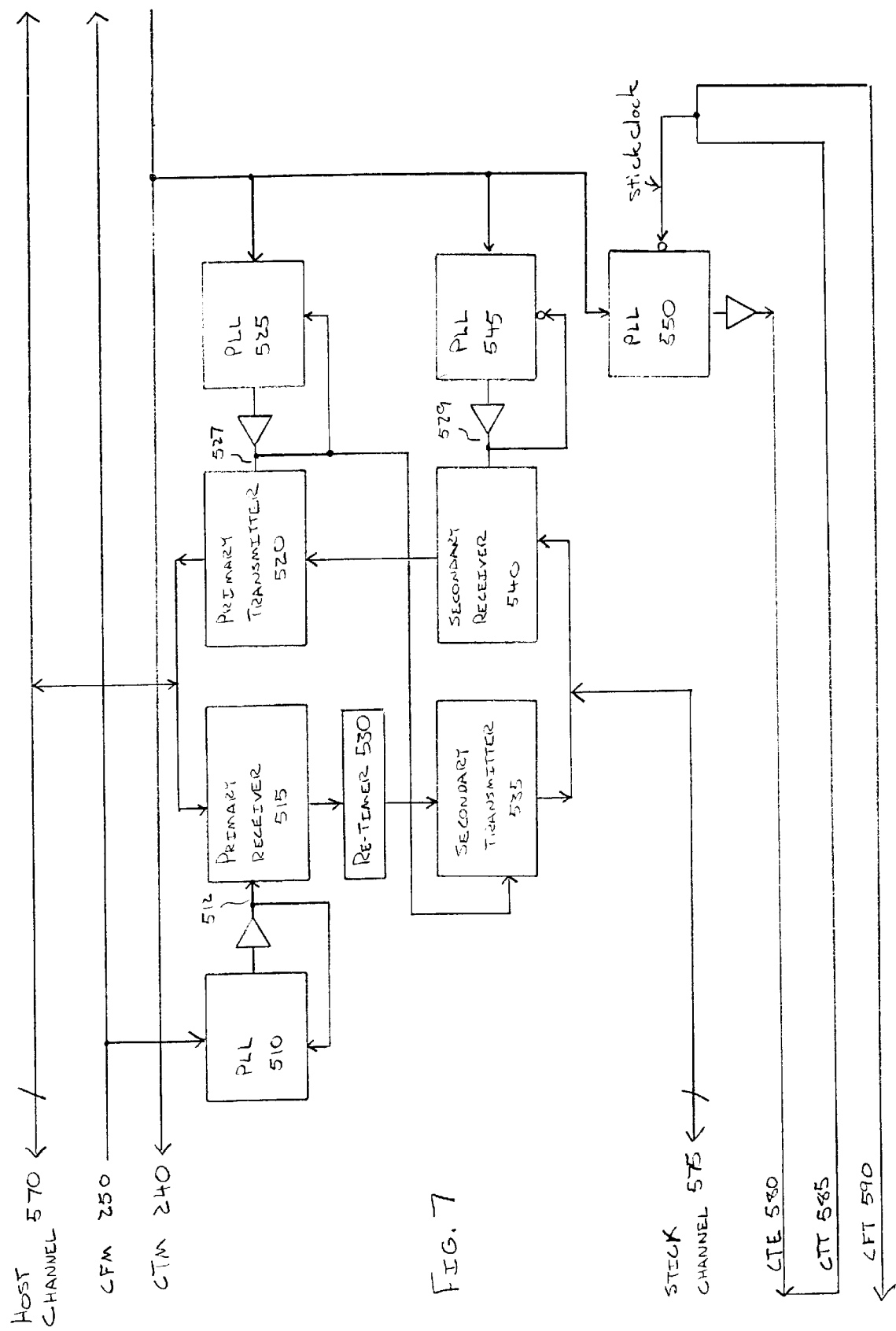
FIG. 7 illustrates the synchronization and transceiver logic of a transceiver 220 according to one embodiment.

FIG. 7 illustrates the synchronization and transceiver logic of a transceiver 220 according to one embodiment. The transceiver 220 receives a host channel 570 that couples the transceiver 220 to a master device along with signal lines for clock signals CTM 240 and CFM 250. Though not shown, the transceiver 220 may also include isolation circuitry and power saving circuitry as described above in reference to FIG. 6.

The transceiver 220 also receives signal lines for clock signals CTE 580, CTT 585 and CFT 590 along with a stick channel 575 that couples the transceiver 220 to memory devices and/or other transceivers.

The transceiver 220 includes a phase locked loop (PLL) 510 which performs a clock recovery function, generating a buffered output 512 in phase alignment with CFM 250. This recovered version of CFM 250 is input to the primary receiver 515 where it is used to time reception of signals from the host channel 570. The transceiver 220 also includes PLL 525 to generate a recovered version of CTM 240 (i.e., buffered output 527) for clocking primary transmitter 520. A PLL 550 is used to generate CTE 580 for the stick channel such that CTT 585 arrives at the transceiver 180 degrees out of phase with CTM 240. This inverted version of CTM 240 is designated "stick clock" in FIG. 7. PLL 545 is also used to generate a clock signal 529 that is 180 degrees out of phase with CTM 240 (i.e., in phase with the stick clock) for clocking the secondary receiver 540. The 180 degree phase offset between CTM 240 and the stick clock permits the latency between reception of signals in secondary receiver and retransmission of the signals at the primary transmitter 520 to be aligned on half-clock cycle boundaries (e.g., 1.5 clock cycles as shown in FIG. 3A).

Because transceiver 220 receives data from the host channel 570 in response to edges of CFM 250 and then retransmits the data on the stick channel in response to edges of CTM 240, the time required to cross the transceiver in the direction of the stick channel ($t_{LAT(PS)}$) is compensated by the amount of time by which CFM 250 lags CTM 240. That is, $t_{LAT(PS)}$ is equal to the number of cycles of CTM 240 that transpire during the transceiver crossing, less $t_{TR}$. By contrast, data crossing the transceiver in the direction of the host channel 570 is both received and retransmitted in response to clock edges aligned with edges of CTM 240 (StickClk being an inverted version of CTM 240). That is, $t_{LAT(SP)}$ is equal to the number of cycles of CTM 240 consumed crossing the transceiver without compensation for $t_{TR}$. This asymmetry between $t_{LAT(PS)}$ and $t_{LAT(SP)}$ results in a bidirectional transceiver crossing time that includes compensation for $t_{TR}$, thus causing the round-trip latency between the master device and a given stick channel to be aligned to the CTM 240 clock.

Transceiver 220 also includes a re-timing circuit 530 that delays the data transfer between the primary receiver 515 and the secondary transmitter 535 when $t_{TR}$ becomes so small that half clock cycle boundary may be crossed. More specifically, re-timing circuit 530 determines the phase difference ($t_{TR}$) between the recovered versions of CTM 240 and CFM 250 and selects between a delayed and a non-delayed path for transferring data from primary receiver 515 to secondary transmitter 535, ensuring that the overall $t_{LAT(PS)}$ is a fixed number of clock cycles less $t_{TR}$.

Figure 8:
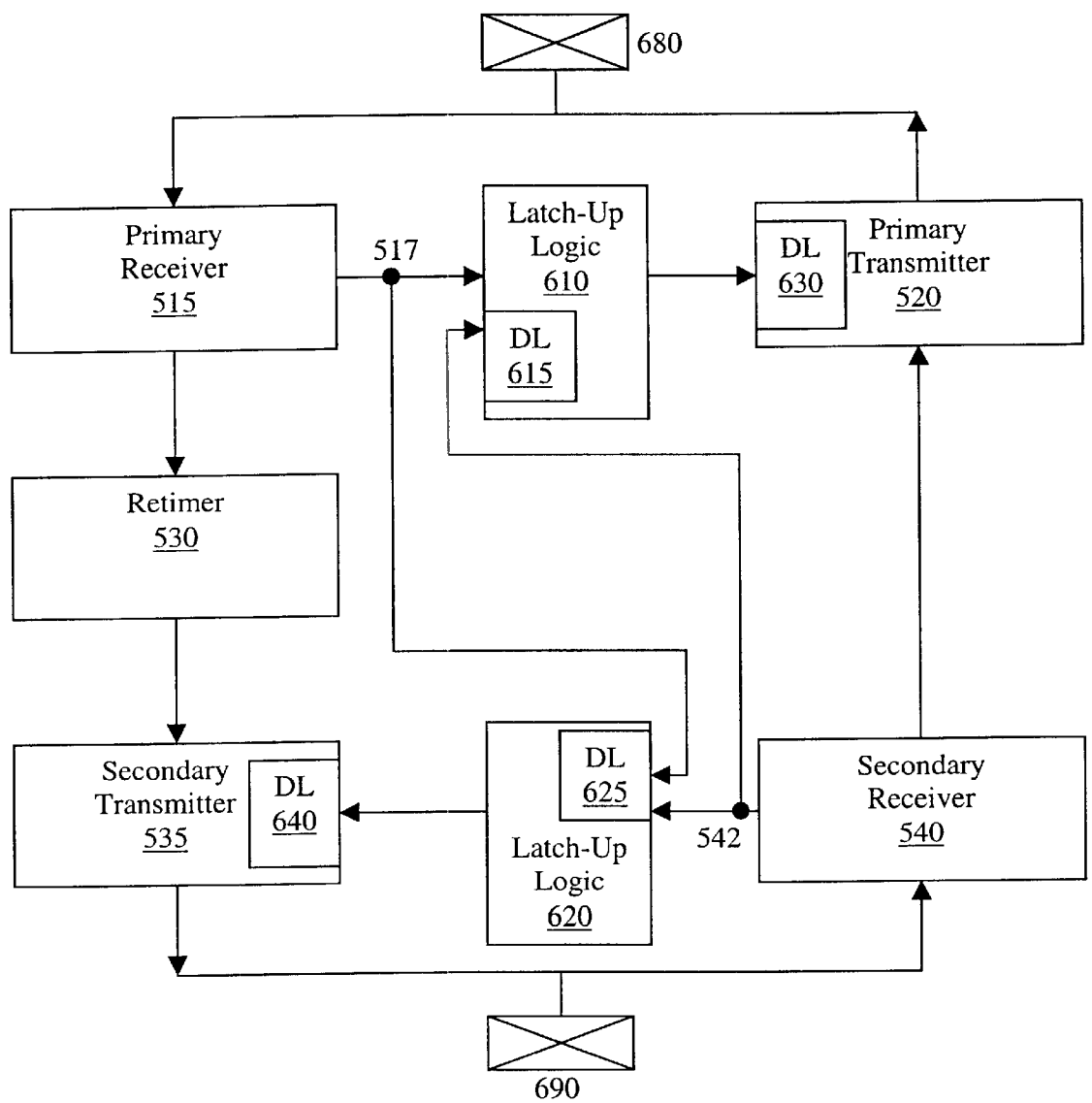
FIG. 8 is a diagram of a transceiver that includes circuitry for preventing a latch-up condition.

FIG. 8 is a diagram of a transceiver that includes circuitry for preventing a latch-up condition. Latch-up occurs when data received from a first channel and transmitted to the second channel is detected on the second channel, and promptly retransmitted to the first channel. This feedback latches the device into a state.

Portions of the transceiver have been omitted from FIG. 8 for simplicity. Only the primary receiver 515, primary transmitter 520, secondary transmitter 535, secondary receiver 540, and re-timer 530 are shown.

A latch-up prevention logic 610 is placed between primary receiver 515 and primary transmitter 520. A similar latch-up prevention logic 620 is placed between secondary transmitter 535 and secondary receiver 540. The latch-up prevention logic 610 receives an input from the primary receiver 515 and from the secondary receiver 540. The output of the latch-up prevention logic 610 is coupled to a disable logic (DL) 630 in the primary transmitter 520. Similarly, the latch-up prevention logic 620 receives an input from the secondary receiver 540 and the primary receiver 515. The output of the latch-up prevention logic 620 is coupled to a disable logic (DL) 640 in the secondary transmitter 535. Pin 680 is coupled to the host channel 570(not shown), while pin 690 is coupled to stick channel 575 (not shown).

When the primary receiver 515 receives data from the host channel 570, it sends a disable signal through node 517 to the latch-up prevention logic 610. The latch-up prevention logic 610 sends a disable signal to the primary transmitter's disable logic 630. The disable logic 630 prevents the primary transmitter 520 from transmitting information received from the secondary transceiver 540 for a period of time. The disable signal is also sent to the disable logic (DL) 625 of latch-up prevention logic 620. The disable signal turns off the latch-up prevention logic 620. The data received by the primary receiver 515 is transmitted, through the secondary transmitter 535 to the stick channel. When the secondary receiver 540 receives the same data from the stick channel, the latch-up prevention logic 620 is already disabled, preventing the turning off of the secondary transmitter 535. Furthermore, the primary transmitter 520 is already disabled, preventing the retransmission of the data to the host channel. In this manner, the latch-up prevention logic 610 prevents the system latch up.

The latch-up prevention logic 610, 620 releases their transmitter, 520 and 535 respectively, after the entire data is transmitted by the primary receiver 515.

Similarly, if data is first received on the stick channel by the secondary receiver, latch-up prevention logic 620 disables secondary transmitter 535 through disable logic 640. The disable signal further disables latch-up prevention logic 610 through disable logic 615. Using the above-described latch-up prevention logics, the danger of latch-up is avoided.

For one embodiment, the latch-up prevention logic 610 may be implemented as an AND gate and an inverter, such that the output of the secondary receiver 540 is inverted, and coupled as an input to an AND gate. The other input to the AND gate is the logic from the primary receiver 515. In this way, only when the output of the primary receiver 515 is on, while the output of the secondary receiver 540 is off, does the latch-up prevention logic 610 output its disable signal.

Although the exemplary embodiments of latency-aligning receivers and systems and methods for incorporating latency-aligning receivers have been described in terms of memory systems. It will be appreciated that the concepts and principles disclosed are not limited to memory systems, but rather may be applied in any system where it is desirable to increase the number of devices attached to a communication path without overloading the communication path or complicating system timing. More generally, though the invention has been described with reference to specific exemplary embodiments thereof, it will be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A memory module configured to be coupled to a primary channel for receiving data and control signals from a controller, the memory module comprising:
   a memory integrated circuit (IC);
   a secondary channel configured to transmit the data and control signals to the memory IC; and
   a transceiver coupled to the primary channel and the secondary channel, the transceiver electrically isolating the secondary channel from the primary channel, the transceiver being a low latency repeater to permit the data and the control signals from the controller to reach the memory (IC), wherein the transceiver is further configured such that a round trip latency of a data request from the controller to the memory IC is independent of a distance of the of memory IC from the controller.

2. The memory module of claim 1, wherein the transceiver further comprises:
   a slave interface configured to receive the data and the signals on the primary channel synchronized to a first set of clock signals from the controller; and
   a master interface configured to send data and signals on the secondary channel synchronized to a second set of clock signals to memories coupled to the secondary channel, such that the second set of clock signals is synchronized to a clock signal from the controller, making transactions from the secondary channel to the primary channel synchronous.

3. The memory module of claim 2, wherein the first set of clock signals comprises a clock-to-master (CTM) signal and a clock-from-master (CFM) signal, and
   the second set of clock signals is synchronized to the CTM signal.

4. The memory module of claim 1, wherein transmitters in the transceiver are synchronized to align I/O switching noise.

5. The memory module of claim 1, wherein the transceiver comprises:
   a primary receiver configured to receive the data and the signals from the primary channel;
   a primary transmitter configured to transmit the data and the signals to the primary channel;
   a secondary transmitter configured to transmit the data and the signals to the secondary channel;
   a secondary receiver configured to receive the data and the signals from the secondary channel; and
   a re-timer located between the primary receiver and the secondary transmitter to re-time the data and the signals from a clock signal on the primary channel to a clock signal on the secondary channel.

6. The memory module of claim 5, wherein the clock signal on the secondary channel is synchronized to the clock signal on the primary channel, and wherein the transceiver is configured to retransmit data from the secondary channel to the primary channel without re-timing the retransmitted data.

7. The memory module of claim 5, wherein the low latency repeater is a bi-directional repeater, and the repeater includes latch-up prevention logic to prevent feedback latch-up between the primary channel and the secondary channel, the latch-up prevention logic preventing re-transmittal of information received by the primary receiver from the primary channel by the primary transmitter back onto the primary channel.

8. The memory module of claim 1, wherein the latch-up prevention logic includes disable logic configured to block data transmission from the primary channel to the secondary channel, while permitting transmission from the secondary channel to the primary channel.

9. The memory module of claim 1, wherein the transceiver is configured to be positioned with respect to the controller such that a time of flight of the data and control signals from the controller to the transceiver over the primary channel is less than one half of a predefined clock cycle of a clock signal with which transmission of the data over the primary channel is synchronized.

10. A memory system comprising:
    a memory master coupled to a memory channel;
    a transceiver coupled to the memory channel, the transceiver configured to receive data from the memory master with a clock-from-master (CFM) timing, the transceiver further configured to re-time the data from the memory master and to transmit the data to memory integrated circuit (IC) devices coupled to the transceiver with a clock-from-transceiver (CFT) timing, and the transceiver also configured to receive data from the memory IC devices with a clock-to-transceiver (CTT) timing and to transmit, the data to the memory master with a clock-to-master (CTM) timing;
    wherein the CFM and CTM are clock signals traveling over the memory channel in opposite directions, the CTT and CFT and clock signals traveling over a secondary channel in opposite directions, and the CTT and the CFT are synchronized to the CTM, such that data transmitted from the memory IC devices to the memory master is not re-timed by the transceiver.

11. The memory system of claim 10, wherein the transceiver is further configured such that a round trip latency from the memory master to the memory IC is independent of a distance of the memory IC devices from the, memory master.

12. A transceiver comprising:
    a slave interface coupled to a primary channel for receiving data from and transmitting data to a memory master using clock-from master (CFM) and clock-to-master (CTM) signals;
    a master interface coupled to a secondary channel for receiving data from and transmitting data to a memory integrated circuit (IC) using clock-to-transceiver (CTT) and clock-from-transceiver (CFT) signals; and transceiver circuitry coupled to the slave interface and master interface for retransmitting using the CTM signal the data received at the slave interface with the CTT signal;

the transceiver circuitry including a re-timer for re-timing data received with the CFM signal from the primary channel to retransmit the data with the CFT signal on the secondary channel;

wherein the transceiver circuitry is configured such that no re-timing is performed by the transceiver circuitry when retransmitting to the primary channel, using the CTM signal, the data received from the secondary channel, using the CTT signal.

13. The transceiver of claim 12, the transceiver circuitry comprising:

a primary receiver configured to receive the data and the signals from the primary channel;

a primary transmitter configured to transmit the data and the signals to the primary channel;

a secondary transmitter configured to transmit the data and the signals to the secondary channel;

a secondary receiver configured to receive the data and the signals from the secondary channel; and the re-timer located between the primary receiver and the secondary transmitter to re-timing the data and the signals from a clock signal on the secondary channel to a clock signal on the primary channel.

14. The transceiver of claim 12, further comprising:

isolation logic to isolate the transceiver from the primary channel to prevent transmission of data on the primary channel to the secondary channel.

15. The transceiver of claim 12, further comprising:

latch-up prevention logic to prevent feedback of data between the primary channel and the secondary channel.

16. The transceiver of claim 12, wherein the transceiver is further configured such that a round trip latency from the memory master to the memory IC is independent of a distance of the memory IC from the memory master.

17. A method of extending a memory channel comprising:

receiving data from and transmitting data to a memory master on a primary channel;

receiving data from and transmitting data to a memory integrated circuit (IC) on a secondary channel;

re-timing data received from the primary channel to retransmit the data on the secondary channel, such that the data on the primary channel is clocked to a first primary clock while the data on the secondary channel is clocked to a first secondary clock;

retransmitting data received from the secondary channel using a second secondary clock onto the primary channel using a second primary clock; wherein the first and second primary clocks are transmitted in opposite directions on the primary channel, and the first and second secondary clocks are transmitted in opposite directions on the secondary channel; and synchronizing a the second secondary clock on the secondary channel to the second primary clock on the primary channel such that data transmitted from the secondary channel to the primary channel is not re-timed.

18. The method of claim 17, further comprising:

blocking data received on the secondary channel from the primary channel from being retransmitted to the primary channel to prevent latch-up.

19. The method of claim 18, wherein the step of blocking comprises:

disabling a transmitter when a data is received on the secondary channel.

20. The method of claim 18, further comprising:

isolating the transceiver to prevent transmission of data from the primary channel to the secondary channel.

21. The method of claim 17, wherein the clocks that are synchronized are a clock-to-master (CTM) on the primary channel and a clock-to-transceiver (CTT) on the secondary channel.

22. The method of claim 17, wherein a round trip latency from the memory master to the memory IC is independent of a distance of the memory IC from the memory master.

23. A clocking scheme for extending a memory channel from a memory master, the clocking scheme comprising:

a clock-from-master (CFM) for clocking data sent by the memory master to a transceiver;

a clock-to-master (CTM) for clocking data sent to the memory master by the transceiver, the CFM and CTM coupled together in the memory master;

a clock-to-transceiver (CTT) for clocking data received by the transceiver from a memory integrated circuit (IC) device;

a clock-from-transceiver (CFT) for clocking data sent by the transceiver to the memory IC device;

a re-timer for re-timing data received with the CFM from the memory master, such that the data is sent to the memory device with the CFT; and a synchronizer for synchronizing the CTM and the CTT, such that data sent from the memory device to the memory master is not re-timed when that data is received from the memory device and retransmitted by the transceiver to the memory master.

24. The clocking scheme of claim 23, wherein a round trip latency from the memory master to the memory IC is independent of a distance of the memory IC from the memory master.

25. A method of extending a memory channel by coupling a transceiver between a master device and a memory device, the method comprising:

transmitting data from the master device on a primary channel to the memory device on a secondary channel through the transceiver, the data transfer having a latency of $(2.5 \times t_{CYCLE}) - t_{TR}$, where $t_{TR}$ depends on a distance of the transceiver from the master device;

transmitting data from the memory device on a secondary channel to the master device on a primary channel, the data transfer having a latency of $1.5 \times t_{cycle} + t_{TR}$;

such that a latency of a round trip of the master device requesting data and the memory device supplying the data is $(1.5 \times t_{cycle} + t_{TR}) + (2.5 \times t_{cycle} - t_{TR}) = 4 \times t_{CYCLE}$, thus the latency is independent of the distance of the transceiver from the master device.

* * * * *

UNITED STATES PATENT AND TRADEMARK OFFICE
CERTIFICATE OF CORRECTION

PATENT NO.     : 6,643,752 B1
DATED          : November 4, 2003
INVENTOR(S)    : Kevin Donnelly et al.

It is certified that error appears in the above-identified patent and that said Letters Patent is hereby corrected as shown below:

Column 12,
Line 46, between the words "transmit" and "the", delete the comma.
Line 58, between the words "the" and "memory", delete the comma.

Column 13,
Line 60, after the word "synchronizing", delete the word "a".

Column 14,
Line 7, after the word "when", delete the word "a".

Signed and Sealed this

Twenty-seventh Day of April, 2004

JON W. DUDAS
*Acting Director of the United States Patent and Trademark Office*